May 25, 1943.    L. F. BENDER    2,320,210
MOTORCYCLE SEAT
Filed Nov. 18, 1940
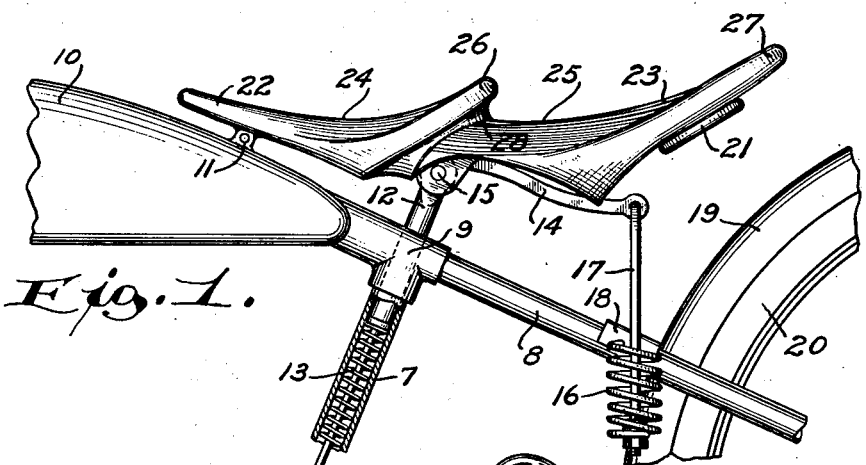
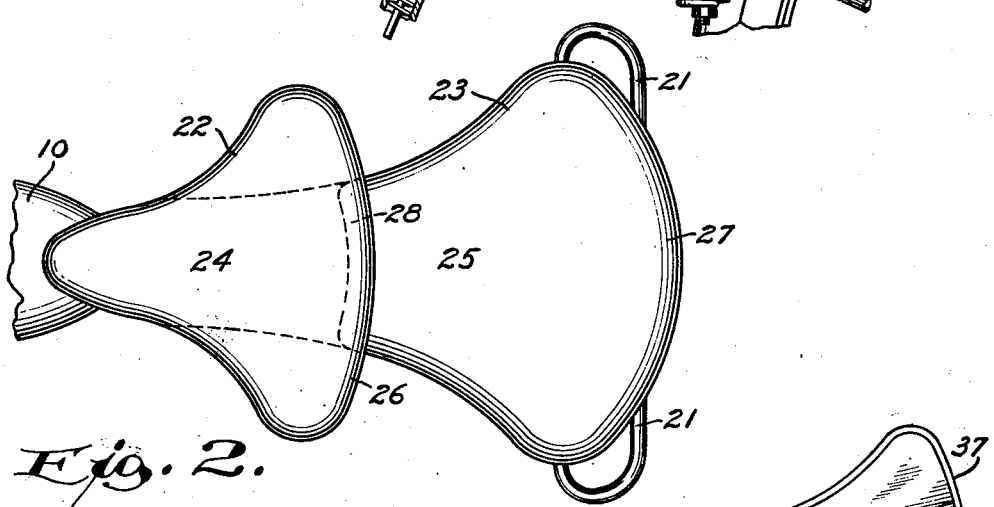
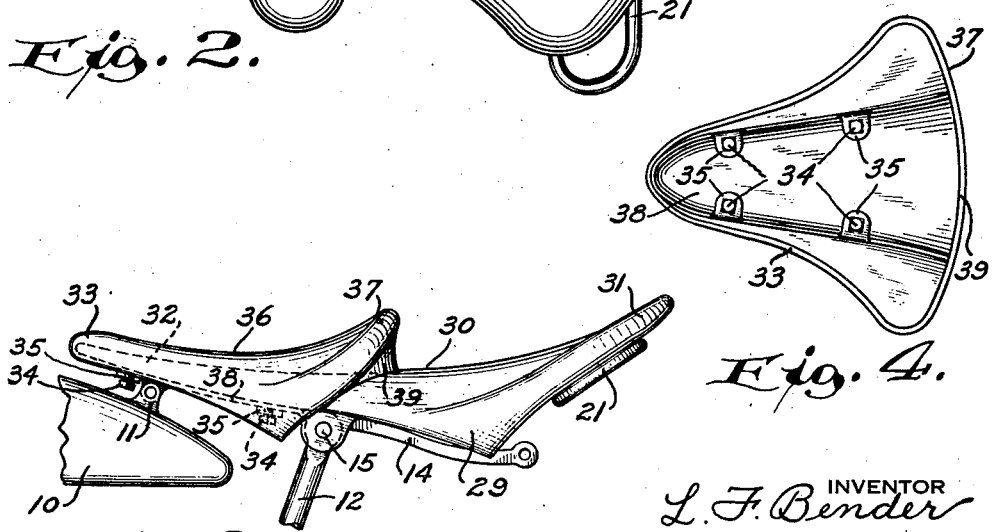
INVENTOR
L. F. Bender
BY Morsell, Lieber & Morsell
ATTORNEYS.

Patented May 25, 1943

2,320,210

UNITED STATES PATENT OFFICE 2,320,210

MOTORCYCLE SEAT

Lloyd F. Bender, Waukesha, Wis.

Application November 18, 1940, Serial No. 366,029

5 Claims. (Cl. 155—5.13)

The present invention relates in general to improvements in seat structures, and relates more specifically to improvements in the construction and operation of tandem seat assemblages for motorcycles or the like.

An object of the invention is to provide a new and useful motorcycle seat assemblage which may be comfortably utilized by either one or two occupants.

It has heretofore been common practice to provide relatively long resiliently suspended seats for motorcycles, so that each seat would accommodate either a single occupant when riding alone, or two occupants sitting upon the seat in tandem when riding in multiple. These long prior seats were usually each provided with but a single seating saddle, and while this single saddle type of seat is quite comfortable when occupied by a single person, it is extremely uncomfortable at times, when occupied in tandem, because the front occupant tends to slide rearwardly and the rear rider tends to slide forwardly due to inertia, thereby causing the two people to shove each other back and forth on the seating surface whenever the vehicle speed is suddenly increased or diminished. While it has heretofore been proposed to provide a tandem rider's seat having front and rear seat sections or saddles the former of which was located below the level of the latter, this prior tandem seat assemblage only partially overcame the objectionable sliding action by preventing the front rider from sliding rearwardly onto the rear seat section. It did not prevent the rear rider from sliding forwardly into the relatively small front seat compartment because the rear seat section was above the front saddle compartment and there was no ridge or mound between the two seat sections, which would tend to prevent such undesirable displacement of the rear rider, thus making this prior tandem seat even more objectionable than the single saddle long seat.

It is therefore a more specific object of my present invention to provide an improved tandem motorcycle seat having individual front and rear riders' saddles separated by a ridge for positively confining each occupant to his or her section of the seat.

Another specific object of my invention is to provide an improved attachment for readily converting a single saddle ordinary motorcycle seat, into an individual two saddle tandem seat having the saddles separated in a manner to effectively prevent undesirable back and forth sliding of the occupants.

These and other specific objects and advantages of the invention will be apparent from the following detailed description.

A clear conception of the several features constituting my present improvement, and of the mode of constructing and of utilizing tandem motorcycle seats embodying the invention, may be had by referring to the drawing accompanying and forming a part of this specification wherein like reference characters designate the same or similar parts in the various views.

Fig. 1 is a side elevation of a fragment of a conventional motorcycle having one of the improved custom built tandem seats resiliently mounted thereon;

Fig. 2 is a top view of the seat assemblage of Fig. 1;

Fig. 3 is a side elevation of a modified type of the improved seat comprising a standard single saddle seat converted by an attachment into a tandem assemblage; and Fig. 4 is a bottom view of the converting attachment of the seat assemblage shown in Fig. 3.

While I have shown and described the invention as being embodied in only two specific types of tandem seats especially applicable to motorcycles, it is not my desire or intent to thereby unnecessarily restrict the scope or utility of the improvement.

Referring specifically to Figs. 1 and 2, the conventional or typical motorcycle assembly shown therein, comprises in general a main frame having a tubular forwardly and downwardly inclined seat post receiving strut 7 and rearwardly and downwardly inclined tubular arms 8 rigidly attached to the strut 7 by a bracket 9; a feul tank 10 rigidly attached to the frame bracket 9 and being provided with a seat hinge connection 11 at its top portion; a seat supporting post 12 slidable within the tubular frame strut 7, and coacting with a compression spring 13 confined within the strut 7; an elongated saddle seat base 14 having its forward end pivotally connected to the hinge connection 11, its medial portion swingably attached to the upper end of the post 12 by a pivot pin 15, and its rear end resiliently suspended from tension springs 16 by means of rods 17; a bracket 18 for mounting the springs 16 from the fork arms 8 near a rear mud guard 19; a rear wheel 20 revolvable within the guard 19; and grip handles 21 secured to the rear end of the saddle base 14 and projecting laterally beyond the saddle seat. All of these elements are well known in the art, and cooperate to provide a rather flexible and resilient mounting for the seat base 14.

The improved tandem seat assembly shown in Figs. 1 and 2 may be custom built to suit the individual owners and consists of two somewhat similar front and rear saddles 22, 23 respectively, firmly secured to the elongated saddle base 14. The lowest portions or valleys 24, 25 of the two saddles 22, 23 are preferably disposed in approximately the same horizontal plane and are separated by a transverse mound or ridge 26 forming the rear of the front saddle 22, while the rear saddle 23 has a similarly elevated transversely widened rear portion 27. The portion of the rear saddle 23 which adjoins the front ridge 26, is preferably provided with a rounded filler 28 in order to avoid discomfort at the crotch of the rear rider, and the lobes of the front saddle 22 need not be quite as extended as those of the rear saddle 23.

The modified improved tandem seat assembly shown in Figs. 3 and 4 may be used to convert a standard single saddle seat into a tandem unit and vice versa. This modified assemblage consists of an elongated single saddle seat 29 having a valley or low portion 30 and a transverse elevated rear portion 31, and also having a relatively long and narrow front end 32; and a removable front saddle 33 adapted to snugly engage the main seat end 32, and to be clamped thereto by means of set screws 34 screw threaded in ears 35 on the saddle 33 and coacting with the main seat base 14. The detachable front saddle 33 has a low portion or valley 36 disposed in approximately the same horizontal plane as the valley portion 30 of the saddle 29, and also has a rear transverse elevated portion 37 forming a rather high ridge between the tandem seating zones of the two saddles 29, 33. The auxiliary saddle 33 may be provided with a metal base 38 with which the clamping ears 35 are associated, and the rear part of the ridge portion 37 may be provided with a croach protecting filler 39 as shown in Fig. 3. It will be apparent that this modified tandem seat assembly may be quickly converted from a single saddle seat into a multiple or tandem saddle structure, and vice versa, and that the auxiliary saddle may be applied to a standard seat.

From the foregoing detailed description it will be apparent that my present invention provides an improved tandem seat assemblage especially applicable to motorcycles, which may be comfortably occupied by either one or two riders, and which may also be quickly converted from one form into another. In the improved tandem saddle structure, the two saddles are most effectively separated by a transverse ridge extending well above the low portions or valleys of both saddles, so that the occupants cannot be undesirably displaced from their respective saddle pockets due to inertia. The improved tandem seats may be resiliently mounted in the usual manner, and may be manufactured and sold at moderate cost. The improvement has proven highly satisfactory and successful in actual use, and permits a single rider to assume either of two positions if he so desires.

It should be understood that it is not desired to limit this invention to the exact details of construction or to the precise mode of use, herein shown and described, for various modifications within the scope of the claims may occur to persons skilled in the art.

I claim:

1. A cycle seat, comprising, an elongated resiliently supported main saddle, and an auxiliary saddle removably secured to the front portion of said main saddle, the rear of said auxiliary seat providing a transverse elevated ridge spanning the medial portion of said main saddle.

2. A cycle seat, comprising, an elongated saddle, and an auxiliary saddle detachable mounted upon the forward portion of said elongated saddle, the rear of said auxiliary saddle extending laterally beyond the adjacent portions of said elongated saddle and providing an elevated ridge.

3. A cycle seat, comprising, an elongated main saddle having a laterally widened and elevated rear end portion and a narrow front end portion, and an auxiliary saddle rigidly supported upon said narrow front end portion of said main saddle, said auxiliary saddle having a laterally widened and elevated rear end portion forming a rigid transverse ridge the crest of which is constantly disposed considerably above the adjacent portion of said main saddle.

4. A cycle seat, comprising, an elongated main saddle having a laterally widened and elevated rear end portion and a narrow front end portion, and an auxiliary saddle detachably mounted upon said narrow front end portion of said main saddle, said auxiliary saddle having a laterally widened and elevated rear end portion forming a rigid transverse ridge the crest of which is constantly disposed considerably above the adjacent portion of said main saddle.

5. A tandem cycle seat, comprising, a rear main saddle having a laterally widened and elevated rear edge portion and a narrow forward portion, and a front auxiliary saddle rigidly secured upon said narrow forward portion of said rear main saddle, said front saddle having a laterally widened and elevated rear edge portion forming a rigid transverse ridge the crest of which is constantly disposed considerably above and extends outwardly beyond the forward narrow portion of said rear main saddle, and the adjoining portions of said saddles forming forwardly and downwardly extending leg receiving recesses of fixed shape and size disposed beneath the rear ridge of said front saddle.

LLOYD F. BENDER.